(12) United States Patent
Buergi et al.

(10) Patent No.: US 12,313,176 B2
(45) Date of Patent: May 27, 2025

(54) BUTTERFLY VALVE HOUSING

(71) Applicant: Georg Fischer Rohrleitungssysteme AG, Schaffhausen (CH)

(72) Inventors: Stefan Buergi, Basadingen (CH); Alexander Ernst, Thayngen (CH); Timo Jaeckle, Hilzingen (DE); Lars Mayer, Singen (DE); Maxim Wasetzki, Singen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 4 days.

(21) Appl. No.: 18/368,379

(22) Filed: Sep. 14, 2023

(65) Prior Publication Data
US 2024/0102574 A1   Mar. 28, 2024

(30) Foreign Application Priority Data

Sep. 23, 2022   (EP) ..................................... 22197439

(51) Int. Cl.
*F16K 27/02*   (2006.01)

(52) U.S. Cl.
CPC ................................ *F16K 27/0218* (2013.01)

(58) Field of Classification Search
CPC .................................................. F16K 27/0218
See application file for complete search history.

(56) References Cited

U.S. PATENT DOCUMENTS

| 8,807,529 B2* | 8/2014 | Sisk ..................... F16K 27/0218 |
| | | 251/293 |
| 2005/0029477 A1 | 2/2005 | Wolf | |
| 2012/0112108 A1* | 5/2012 | Barton ..................... F16K 1/44 |
| | | 251/212 |
| 2015/0027563 A1* | 1/2015 | Barton .................. F16K 5/0605 |
| | | 251/367 |
| 2021/0054945 A1* | 2/2021 | Kamimura .......... F16K 27/0218 |

FOREIGN PATENT DOCUMENTS

| JP | 200028006 A | 1/2000 |
| WO | 9935426 A1 | 7/1999 |

* cited by examiner

*Primary Examiner* — Kelsey E Cary
(74) *Attorney, Agent, or Firm* — Harness, Dickey & Pierce, P.L.C.

(57) ABSTRACT

Butterfly valve housing for a butterfly valve having a closing element mounted rotatably in the housing, wherein receiving openings are arranged in the housing between the two flange connection discs and between the reinforcement structure, wherein the receiving openings are directed from the outer circumference in the direction of the vertical centre axis, into which the inserts can be inserted into the housing, wherein the inserts are arranged form-fittingly in the receiving openings.

12 Claims, 5 Drawing Sheets

BUTTERFLY VALVE HOUSING

CROSS-REFERENCE TO RELATED APPLICATIONS

Figure 1:
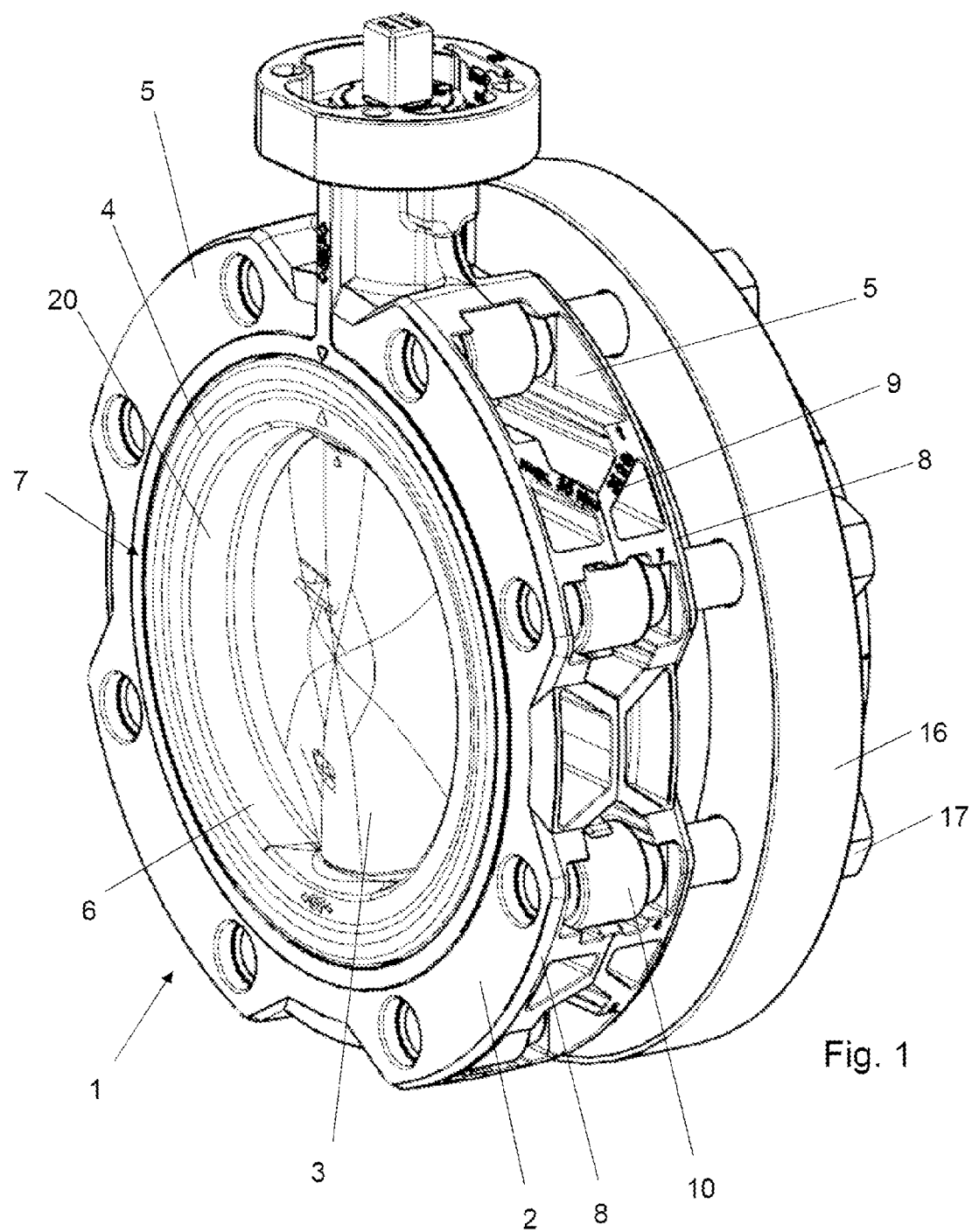

This application claims the benefit and priority to European Patent No. 22 197 439.7 filed Sep. 23, 2022. The entire disclosure of the above application is incorporated herein by reference.

BACKGROUND OF THE INVENTION

Technical Field

The invention relates to a butterfly valve housing for a butterfly valve having a closing element mounted rotatably in the housing, containing a housing formed in one piece from plastic, wherein the housing has an annular body, two flange connection discs arranged at the end faces, and a reinforcement structure, wherein the annular body has an inner diameter that forms a sealing portion, and an outer diameter, wherein the outer diameter of the annular body is smaller than the outer diameter of the flange connection discs, wherein the reinforcement structure is arranged on the outer circumference of the annular body and between the two flange connection discs; and metallic inserts, wherein the inserts are arranged between the flange connection discs around the outer circumference of the annular body.

Discussion

In pipeline construction, butterfly valves with butterfly valve housings are used to close pipelines transporting liquid or gaseous media and to control the flow. Butterfly valves installed between two pipe flanges are referred to as "WAFER type". In this type, the butterfly valve housing is clamped between the two pipe flanges, which are braced together using multiple through-screws.

In butterfly valves of flange-mounted design, the housing has threaded holes for directly screwing to the pipeline flange. Such an embodiment is usually used as an end installation and referred to as "LUG type". With short construction lengths, metallic butterfly valves are usually used for this, with which threaded flange holes are made directly on the housing, and the pipeline flange is then screw-fastened to them.

In plastic designs, metal inserts are usually back-injection-moulded into the housing and have an internal thread with which the pipeline flange can then be screw-fastened. A disadvantage of this is that such a butterfly valve can then only be used as an end installation, since the threaded holes are usually formed as blind holes on only one side and are accessible from only one side. The butterfly valve must therefore be replaced by a "WAFER type", for example, when the pipeline is continued.

JP 2000028006 A2 discloses a butterfly valve designed as a "WAFER type", and therefore the pipeline flanges cannot be screwed directly to the housing, but rather the housing is clamped between the pipeline flanges here.

SUMMARY

The invention is based on the aspect of proposing a butterfly valve housing that is made of plastic and can be used both as an intermediate installation design and as an end installation design and is of the "LUG type" form, and that the butterfly valve can be mounted on both sides so that no installation errors can arise.

This aspect is achieved according to the invention in that receiving openings are arranged in the housing between the two flange connection discs and between the reinforcement structure, wherein the receiving openings are directed or run from the outer circumference in the direction of the vertical centre axis, into which the inserts can be inserted into the housing, wherein the inserts are arranged form-fittingly in the receiving openings.

The butterfly valve housing according to the invention for a butterfly valve having a closing element mounted rotatably in the housing contains a housing formed in one piece from plastic. The housing has an annular body, two flange connection discs arranged at the end faces, and a reinforcement structure. The annular body has an inner diameter that forms a sealing portion and via which the closing element, when in the closed position, closes the butterfly valve tightly with the aid of a sleeve therebetween. The reinforcement structure of the housing adjoins the outer diameter or outer circumference of the annular body, which permits a stable yet lightweight and thin-walled housing. The reinforcement structure is arranged on the outer diameter of the annular body and between the end-face flange connection discs, which protrude beyond the outer diameter of the annular body. As a result, the housing has, on the outer circumference, a reinforcement structure, which is preferably formed by ribbing around the outer circumference. The butterfly valve housing contains metallic inserts, wherein the inserts are arranged between the flange connection discs around the outer circumference of the annular body. To accommodate the inserts in the housing, receiving openings are arranged between the two flange connection discs and between the reinforcement structure. The receiving openings run or extend from the outer circumference or outer diameter of the housing or of the reinforcement structure in the direction of the vertical centre axis, wherein the receiving openings are delimited in the axial direction of the housing by the flange connection discs. The inserts can be inserted into the receiving opening via the outer circumference or outer diameter of the housing. The receiving openings are designed such that the receiving openings are open in the direction of the outer circumference and are each delimited axially by the two flange connection discs and at the top and bottom by the reinforcement structure. Preferably, the reinforcement structure forms a boundary of the receiving openings between the receiving openings around the outer circumference. The inserts in the receiving openings are arranged form-fittingly and can be inserted into the receiving opening only via the outer circumference.

It has been found advantageous when the receiving openings run at right angles to the vertical centre axis; this has the advantage that the housing can be produced more simply using injection moulding. The receiving opening then extends from the outer circumference of the housing or from the reinforcement structure forming the outer circumference and projects inwards towards the vertical centre axis as far as the outer diameter of the annular body.

As an alternative embodiment, the receiving openings are arranged obliquely to the vertical centre axis; specifically preferably, they run directed radially into the centre.

The receiving openings are preferably closed towards the vertical centre axis or are not designed as through-openings but form a blind opening or a receiving pocket.

Preferably, the receiving openings are designed as receiving pockets that are arranged around the housing circumference between the reinforcement structure and the flange connection discs and in which the inserts are accommodated form-fittingly and so as to be removable again.

It has been found advantageous when the inserts in the receiving openings are positioned relative to the outer circumference of the annular body and between the reinforcement structure by means of a spacer element.

Preferably, the inserts are arranged such that they are fixed axially on both sides in the housing between the two flange connection discs and cannot be displaced. The inserts are also fixed in the receiving opening such that they can be removed again via the outer circumference of the housing. This means that the inserts are delimited axially by the two flange connection discs arranged to the left and right of the inserts, as a result of which they cannot be displaced axially. The form-fitting accommodation of the inserts in the receiving opening means that the inserts are also fixed in the direction of the outer diameter or outer circumference, wherein this fixing can be undone again.

A preferred embodiment is one in which a holding element is arranged in the receiving opening to fix the insert in the receiving opening. This ensures that the insert does not become undesirably detached from the housing or rotate.

It is advantageous when the holding element is designed as a flexible snap hook. This makes it possible to fasten the inserts in the housing and remove them again therefrom in a simple manner. It would therefore also be conceivable to use the butterfly valve as a "WAFER type" in which the inserts in the housing are removed and the butterfly valve is clamped between the pipe flanges. When the insert is installed, the snap hook is slightly preloaded in order to fix the insert well in the housing.

Preferably, the butterfly valve housing is mirror-symmetrical along the vertical centre axis. This means that the installation direction of the butterfly valve does not matter, and the fitter does not have to make sure the valve is connected the right way round.

It has been found advantageous when the insert has a continuous internal thread. As a result, the pipeline flange can be screwed directly to the butterfly valve housing as an end installation or else as an intermediate installation. Therefore, a pipeline flange can be screw-fastened directly to the housing from one side or else from both sides with the butterfly valve housing according to the invention.

A preferred embodiment is one in which the insert has different outer diameters. Preferably, the change in the outer diameter is achieved via steps or shoulders in the insert. This makes it possible to reinforce the flange connection disc at the bearing faces or end faces of the inserts without adversely affecting the length of the inserts and there still being a sufficiently long internal thread for fastening the pipe flange even with narrow forms of butterfly valves. It is advantageous when the insert is cylindrical with different outer diameters, wherein the outside cylinders have a smaller diameter than the cylinders therebetween.

It is advantageous that the insert has an anti-rotation means. This prevents the insert from being able to rotate in the receiving opening. Preferably, the insert has, as an anti-rotation means, a straight face on the outer circumference, which straight face then bears against a rib of the reinforcement structure.

It has also been found advantageous when a bridge with which the anti-rotation means on the insert corresponds is formed on the reinforcement structure.

Preferably, the inserts are arranged regularly around the outer diameter of the annular body. It is advantageous when four to 20 inserts are arranged around the circumference, depending on the size or nominal diameter of the butterfly valve.

A preferred embodiment is one in which the butterfly valve housing can be installed independently of installation direction and as an intermediate and end installation component. Since at both end faces owing to the continuous internal thread in the inserts and owing to the stop on both sides for the inserts against the flange connection discs, as a result of which no axial displacement of the inserts is possible, a pipe flange can be fastened to both end faces when the butterfly valve is used as an end installation component, and the installation direction is irrelevant; the installation direction does not matter for use as an intermediate installation component either.

The use according to the invention of a butterfly valve housing is wherein the butterfly valve housing can be used independently of installation direction and with a butterfly valve for intermediate installation and end installation. In addition to the aforementioned features that make it possible to install the butterfly valve housing in both directions, it is also advantageous that the butterfly valve housing is mirror-symmetrical along the vertical longitudinal axis.

All the possible embodiments can be combined freely with one another, both the features mentioned in connection with the butterfly valve housing and those mentioned in connection with the use of the butterfly valve housing.

DRAWINGS

Figure 2:
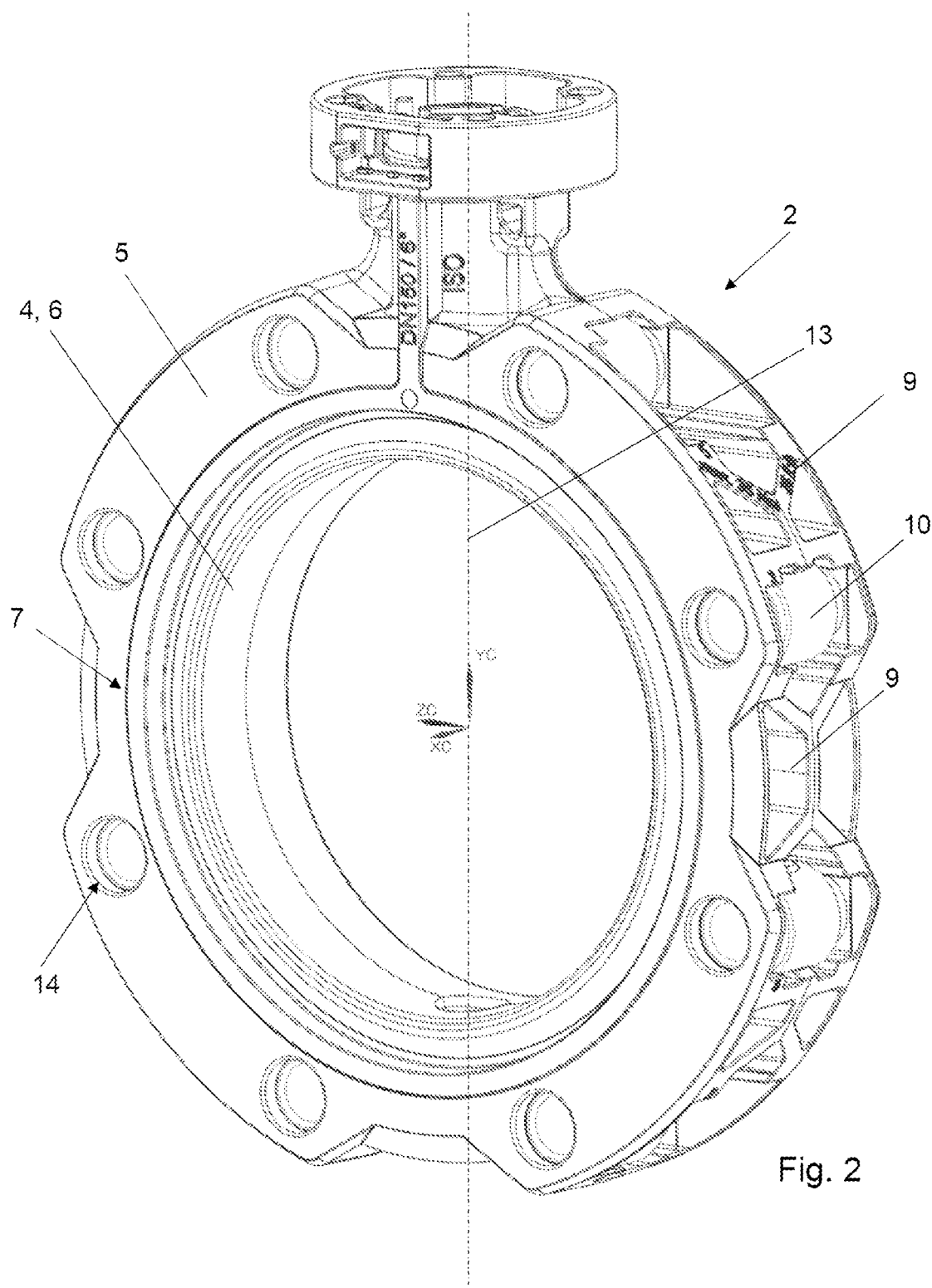
Figure 3:
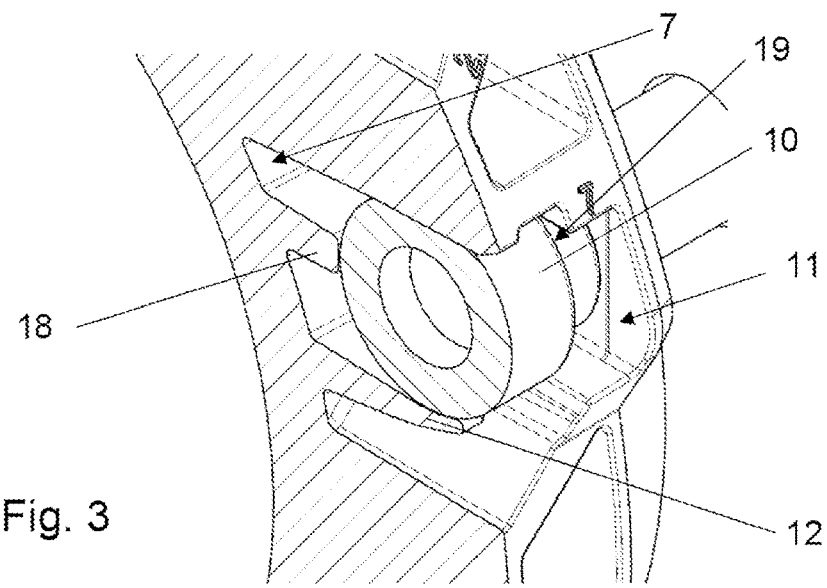
Figure 4:
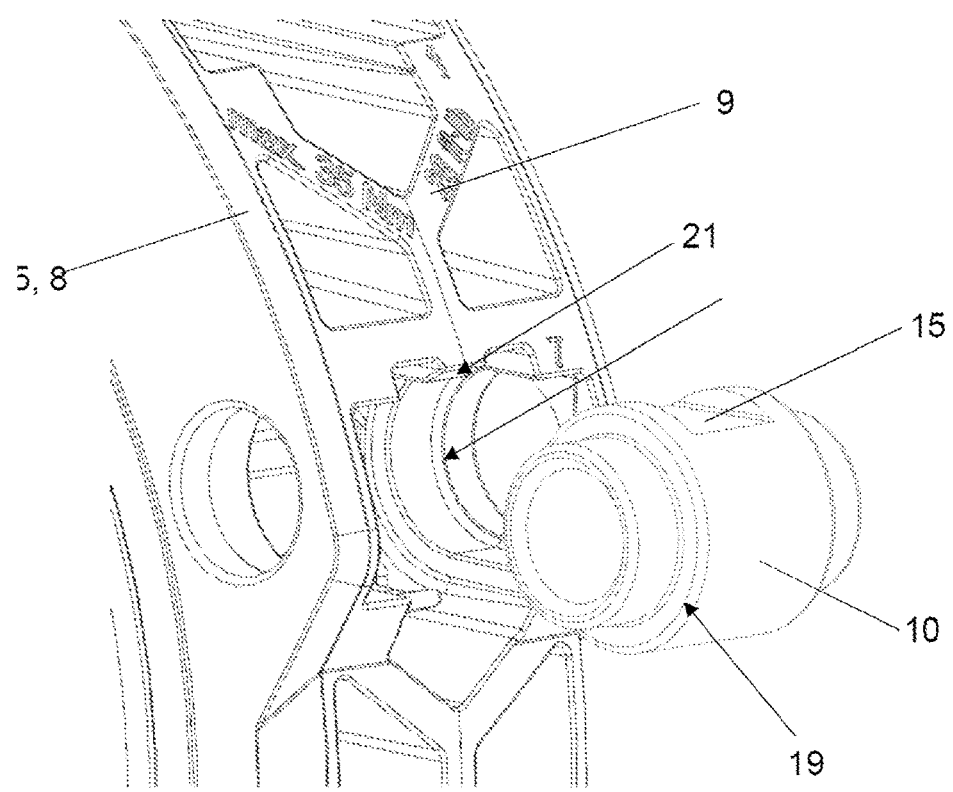
Figure 5:
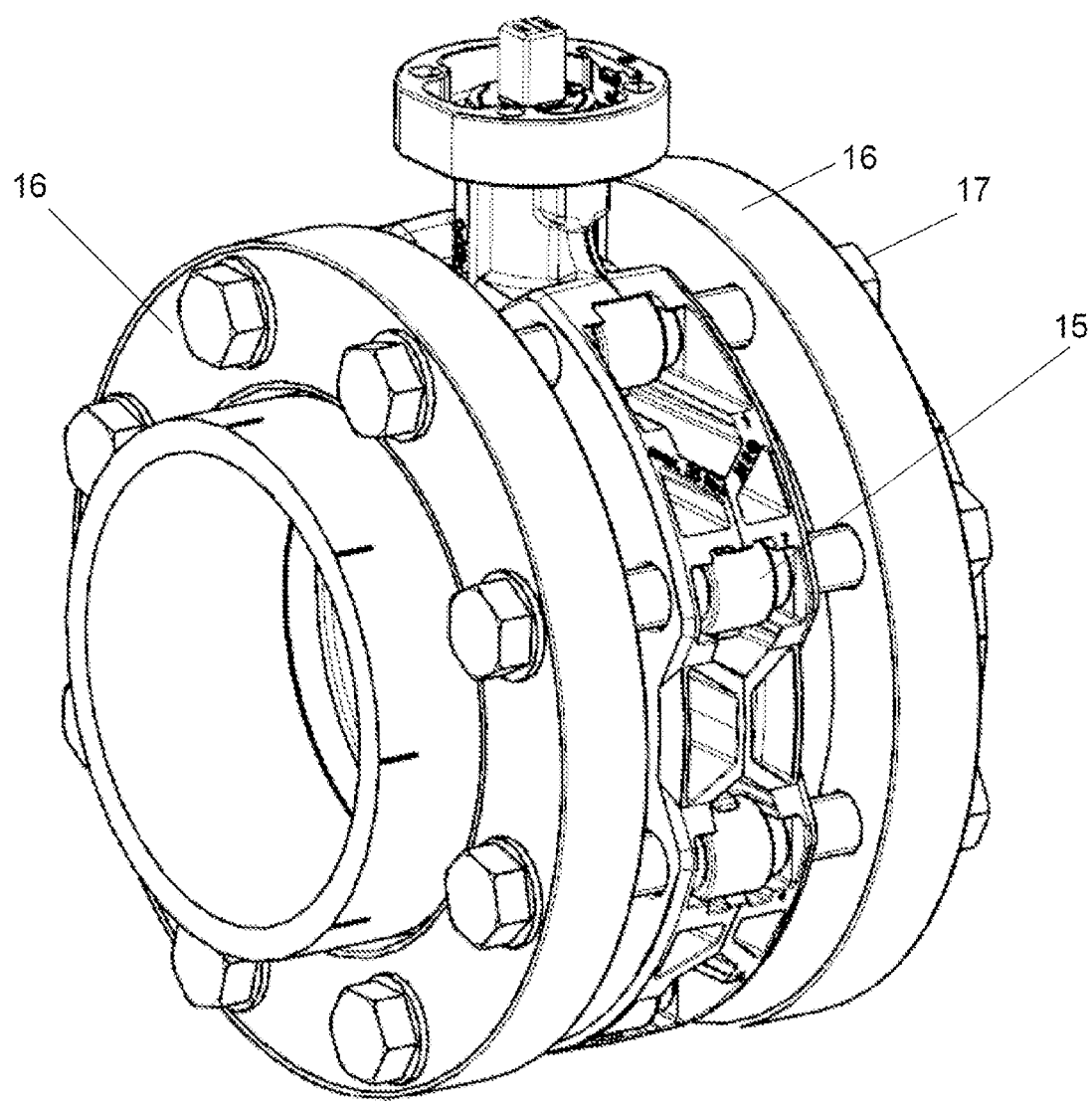
Figure 6:
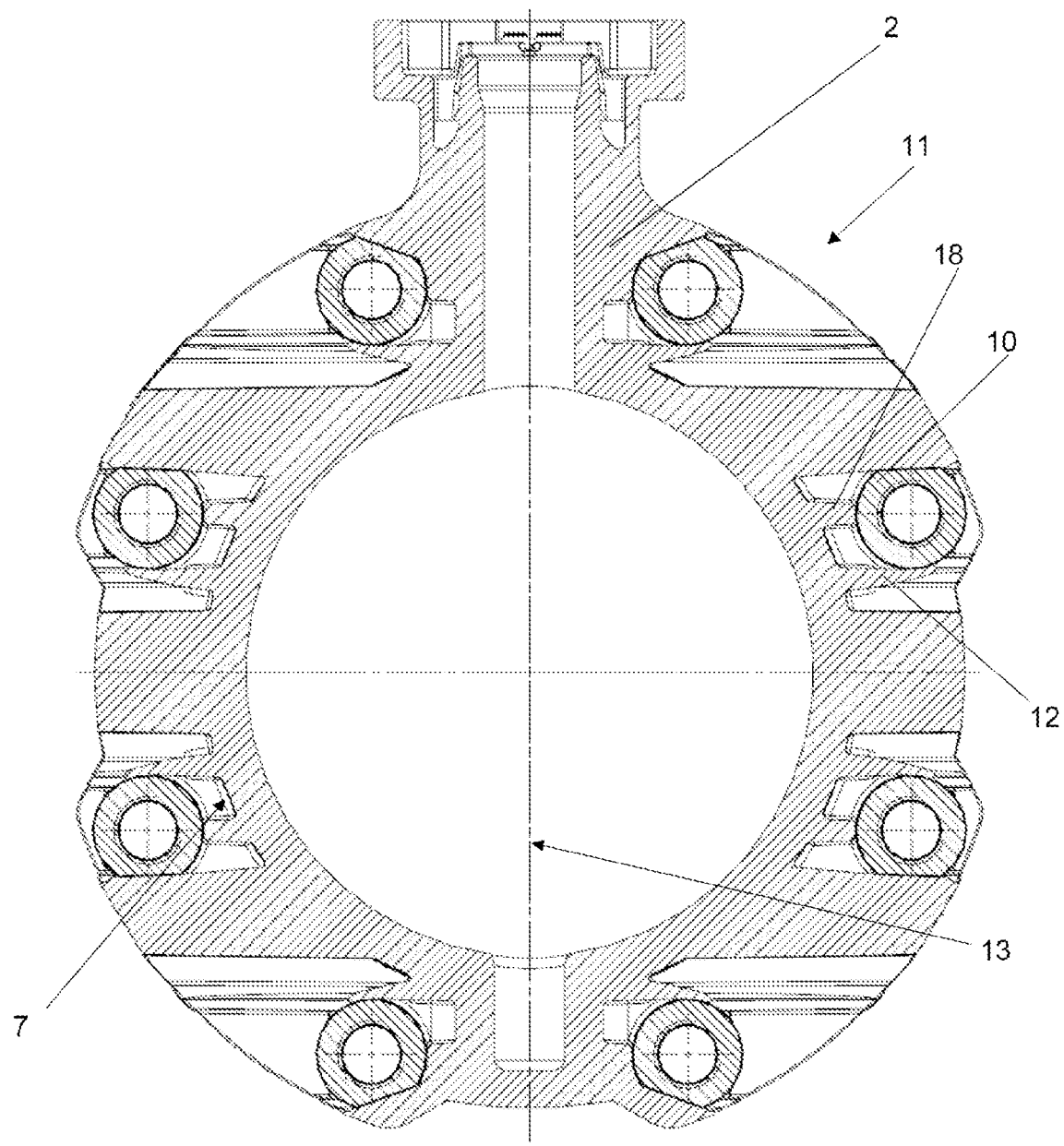

An exemplary embodiment of the invention is described using the figures, but the invention is not limited only to the exemplary embodiment. In the figures:

FIG. 1 shows a three-dimensional diagram of an installed butterfly valve as an end installation with a butterfly valve housing according to the invention, FIG. 2 shows a three-dimensional diagram of a butterfly valve housing according to the invention, FIG. 3 shows a partial section through an insert inserted in the housing, FIG. 4 shows a partial view of a receiving opening with an insert not yet arranged therein, FIG. 5 shows a three-dimensional diagram of an installed butterfly valve as an intermediate installation with a butterfly valve housing according to the invention, and FIG. 6 shows a sectional view of the butterfly valve housing according to the invention.

DESCRIPTION OF THE PREFERRED EMBODIMENTS OF THE INVENTION

The drawing shown in FIG. 1 shows a three-dimensional view of a butterfly valve with a butterfly valve housing 1 according to the invention. In FIG. 1, the butterfly valve housing 1 is used as an end installation component, wherein the variant shown is mainly used when the operating pressure is reduced, and is designed as a "LUG type" owing to the threaded bores, arranged for directly screwing the pipeline flange to the butterfly valve housing, in the inserts 10. End installation means that the butterfly valve is used to terminate a pipeline. This means that the pipe flange 16 can be screwed to the butterfly valve housing 1, as can be seen in FIG. 1 with the fastening means 17. The closing element 3 is arranged sealingly in the butterfly valve housing 1 together with the inner diameter 6 of the annular body 4 and the sleeve 20 arranged therebetween. In FIG. 5, the butterfly valve with the butterfly valve housing 1 according to the invention is also shown as an intermediate installation. This is easily possible with the butterfly valve housing 1 according to the invention, because the inserts 10 have a continuous internal thread for screw-fastening the pipe flanges on both sides. Therefore, when the pipeline is reconstructed, the butterfly valve does not have to be changed, but rather the same butterfly valve as was used as an end installation can also be used as an intermediate installation. FIG. 2 shows a housing 2 according to the invention of a butterfly valve 1. The single-piece plastic housing 2, which has an annular body 4, two flange connection discs 5 arranged on the end faces, and a reinforcement structure 9 arranged on the outer circumference 7 of the annular body 4, is clearly visible. Preferably, the housing 2 is in the form of an injection-moulded part. The reinforcement structure 9 has reinforcement ribs so that the housing 2 has the required stability but is still lightweight. The inner diameter 6 of the annular body 4 forms, with the aid of the sleeve 20, the sealing portion to seal the butterfly valve optimally with the closing element 3 in the closed position. It can clearly be seen in FIG. 3 that the outer diameter 7 of the annular body 4 is smaller than the outer diameter 8 of the flange connection discs 5. As a result, the reinforcement structure 9 can be readily arranged on the outer circumference 7 of the annular body 4 and between the flange connection discs 5 in order to give the housing 2 good rigidity with low weight. Receiving openings 11 are arranged around the circumference between the reinforcement structure 9 and the two flange connection discs 5. These receiving openings are used to accommodate the metallic inserts 10. The metallic inserts 10 can be inserted into the receiving openings 11 on the housing 2 exclusively via the outer circumference of the housing 2, as shown in FIG. 4. The metallic inserts 10, wherein they can be produced from any metallic materials according to the requirements, whether from stainless or non-stainless steel or from a brass or copper alloy, and have a continuous internal thread (not shown). It is likewise conceivable for the inserts to consist of a light metal alloy, since these likewise achieve high strength values these days.

The inserts 10 are fixed axially by the two flange connection discs 5. It is advantageous when the inner sides of the flange connection discs 5 have different thicknesses and the inserts 10 have differently sized outer diameters for this purpose. It has been found advantageous when the inserts 10 have a smaller outer diameter at the end faces than in the middle. As a result, the inserts 10 have the longest possible form without weakening the housing 2 with excessively thin flange connection discs 5 and in order to achieve the longest possible internal thread. Owing to the set-back larger diameter in the middle of the inserts 10, the thickness of the flange connection discs 5 is wider in some regions, and therefore the flange connection discs 5 achieve a sufficiently high strength and are still as thin-walled as possible. This can be seen easily in FIG. 3, in which an insert 10 bears with the shoulder face 19 against the inner side of the flange connection disc 5.

The inserts 10 can also be removed again after installation in the housing 2 by being taken out of the receiving opening 11 via the outer circumference. The receiving openings 11 extend from the outer circumference of the housing 2 in the direction of the vertical centre axis 13 and are formed as blind receiving pockets, as can be seen easily in FIG. 6. The receiving openings 11 run preferably at right angles to the vertical centre axis 13 but can also be arranged obliquely. To position the inserts 10 correctly, a spacer element 18 is preferably arranged in each case on the outer diameter 7 of the annular body 4.

So that the inserts 10 are arranged in a well-fixed but removable manner in the receiving openings, a holding element 12 is preferably arranged in the receiving openings 11, wherein the holding element 12 is preferably designed as a flexible snap hook and is clamped or braced when the insert 10 is introduced into the receiving opening 11. It has also been found advantageous when the insert 10 has an anti-rotation means 15, which prevents the insert 10 from rotating when the fastening means 17 are tightened or loosened. Preferably, this anti-rotation means 15 is designed as a straight face on the outer diameter of the insert 10, which then corresponds with the ribbing of the reinforcement structure 9 or a bridge 21 formed therefor and inhibits rotation. The butterfly housing 1 is constructed mirror-symmetrically along its vertical centre axis 13, which allows the butterfly housing 1 or a butterfly valve to be installed in both directions. The fitter therefore does not have to worry about the installation direction. This is also achieved in that the inserts are fixed axially between the flange connection discs 5.

The inserts 10 have a continuous internal thread likewise to allow the butterfly valve to be installed from both sides. It is advantageous when four to 20 inserts are arranged around the circumference, depending on the pipe diameter.

What is claimed is:

1. A butterfly valve housing for a butterfly valve comprising a closing element mounted rotatably in the housing, the housing being formed in one piece from plastic, wherein the housing has an annular body, two flange connection discs arranged at end faces, and a reinforcement structure, wherein the annular body has an inner diameter that forms a sealing portion, and an outer diameter, wherein the outer diameter of the annular body is smaller than an outer diameter of the flange connection discs, wherein the reinforcement structure is arranged on the outer diameter of the annular body and between the two flange connection discs; and metallic inserts, wherein the inserts are arranged between the flange connection discs around the outer circumference of the annular body, wherein receiving openings are arranged in the housing between the two flange connection discs and between the reinforcement structure, wherein the receiving openings are directed from the outer circumference in the direction of the vertical centre axis, into which the inserts can be inserted into the housing, wherein the inserts are arranged form-fittingly in the receiving openings.

2. The butterfly valve housing according to claim 1, wherein the inserts are arranged such that they are non-displaceable axially on both sides in the housing between the two flange connection discs and are removable in the direction of the outer circumference.

3. The butterfly valve housing according to claim 1, wherein a holding element is arranged in the receiving opening to fix the insert.

4. The butterfly valve housing according to claim 3, wherein the holding element is designed as a flexible snap hook.

5. The butterfly valve housing according to claim 1, wherein the butterfly valve housing (1) is mirror-symmetrical along a vertical centre axis.

6. The butterfly valve housing according to claim 1, wherein at least four inserts are arranged in the housing.

7. The butterfly valve housing according to claim 1, where the insert has an internal thread.

8. The butterfly valve housing according to claim 1, wherein the insert has different outer diameters, wherein a change in outer diameter takes place via steps.

9. The butterfly valve housing according to claim 1, wherein the insert has a smaller outer diameter towards end faces than in the middle.

10. The butterfly valve housing according to claim 1, wherein the insert has an anti-rotation means.

11. The butterfly valve housing according to claim 1, wherein the inserts (10) are arranged regularly around the outer diameter of the annular body.

12. The butterfly valve housing according to claim 1, wherein the butterfly valve housing can be installed independently of installation direction and as an intermediate installation component and an end installation component.

\* \* \* \* \*